United States Patent [19]

Groebli et al.

[11] Patent Number: 4,770,621

[45] Date of Patent: Sep. 13, 1988

[54] PELLET MILL

[75] Inventors: Werner Groebli, Flawil; Hugo Hegelbach, Busswil; Hanspeter Schaffner, Niederuzwil, all of Switzerland

[73] Assignee: Gebruder Buhler AG, Uzwil, Switzerland

[21] Appl. No.: 6,507

[22] Filed: Jan. 22, 1987

Related U.S. Application Data

[63] Continuation-in-part of Ser. No. 744,056, Jun. 12, 1985, Pat. No. 4,711,622.

[30] Foreign Application Priority Data

Jan. 24, 1986 [CH] Switzerland ............... 00287/86

[51] Int. Cl.$^4$ ................. B29C 47/32; B29C 47/52
[52] U.S. Cl. ................. 425/150; 264/40.5; 425/331; 425/DIG. 230
[58] Field of Search ........... 425/331, 150, DIG. 230; 264/40.5, 40.7

[56] References Cited

U.S. PATENT DOCUMENTS

| | | | |
|---|---|---|---|
| 2,240,660 | 5/1941 | Meakin | 425/331 X |
| 2,764,951 | 10/1956 | Fisher | 425/331 |
| 2,778,323 | 1/1957 | Money | 425/DIG. 230 |
| 2,798,444 | 7/1957 | Meakin | 425/204 |
| 2,908,038 | 10/1959 | Meakin | 425/192 R |
| 3,191,227 | 6/1965 | Keefe | 425/331 |
| 3,280,426 | 10/1966 | Meakin | 425/DIG. 230 |
| 3,307,501 | 3/1967 | Wenger | 425/331 |
| 3,332,111 | 7/1967 | Hafliger | 425/331 X |
| 3,382,818 | 5/1968 | Landers | 425/331 |
| 3,467,031 | 9/1969 | Hafliger | 425/331 |
| 3,538,546 | 11/1970 | Gilman | 425/331 X |
| 3,581,678 | 6/1971 | Landers | 425/331 X |
| 3,679,343 | 7/1972 | Gilman | 425/331 |
| 3,723,042 | 3/1973 | Raydt | 425/331 |
| 3,841,817 | 10/1974 | Moldenhauer et al. | 425/331 |
| 3,901,635 | 8/1975 | Greenberger | 425/150 X |
| 3,932,091 | 1/1976 | Vink | 425/331 |
| 3,932,736 | 1/1976 | Zarow et al. | 425/DIG. 230 |
| 3,981,664 | 9/1976 | Bittner et al. | 425/331 |
| 4,446,086 | 5/1984 | Molenaar et al. | 425/331 X |

FOREIGN PATENT DOCUMENTS

0040406 1/1984 European Pat. Off. .
0101614 5/1985 European Pat. Off. .
3121613 8/1982 Fed. Rep. of Germany .

Primary Examiner—Richard L. Chiesa
Attorney, Agent, or Firm—Merchant, Gould, Smith, Edell, Welter & Schmidt

[57] ABSTRACT

Attached to the eccentric studs (25) for supporting and positioning press rollers (b 20) relative to an inner surface of the die (21) of a pellet mill are levers (30). Linked to the levers (30) is a cylinder/piston unit (31) that is provided with a position controller (47) whose position measuring means is constructed as part of the adjusting means (31) for the position of the press rollers (20). In this fashion, the gaps between press rollers (20) and die (21) can be regulated very exactly from the outside.

24 Claims, 8 Drawing Sheets

PELLET MILL

CROSS REFERENCE TO RELATED APPLICATION

This is a continuation-in-part of co-pending application Ser. No. 744,056 filed June 12, 1985 now U.S. Pat. No. 4,711,622.

FIELD OF THE INVENTION

The invention concerns a cube press, also called a pellet press or mill, having a die provided with perforations and with press rollers that press the product collected between said rollers and the die through said perforations, and further having an adjusting mechanism for setting the gap between the press rollers and the die.

BACKGROUND AND SUMMARY OF INVENTION

Known per se is how to control the gap between the die as a function of one parameter of pellet quality via the machine control means. See EP-A No. 1 0 040 406. The invention herein permits, with simple means, achieving a trouble-free positioning of the press rollers that can be controlled externally, either by entering a set point value or by regulating as a function of operating parameters.

The pellet mill in accordance with the invention is characterized by the fact that the displacement mechanism is provided with a means for regulating the position of the press rollers. Possible with this is to regulate the position of the press rollers not only in the desired direction, but rather also to control the extent of displacement as a function of the magnitude of the deviation from a set point to the parameter to the regulated, or possibly the exact press roller position being strived for.

Shown in EP-A2 0 101 614 is a pellet mill whose adjusting mechanism cooperates with a means for measuring the position of the press roller. This pellet mill includes a flat, horizontal die that is attached to the press frame. The press rollers are disposed on horizontal axles that are attached to a supporting head. The supporting head is mounted in rotation-fast but axially displaceable fashion on a vertical shaft driven by the press motor. Mounted on a radial arm on the supporting head is at least one vertical, triangular measurement flag. Attached to the machine frame is a non-contacting sensor that is activated by the measuring flag travelling past. The travel time of the measurement flag past the sensor is a measure of the axial position of the supporting head on the drive shaft and, therewith, of the gap between the press rollers and the die. This measurement can influence the regulation of the press and/or can itself be controlled by the press regulating means. Because the measurement flag is attached to the supporting head and the sensor is attached to the machine frame, there exists the possibility of undesireable influencing of the sensor by the product instead of by the measurement flag. The travel time of the measurement flag past the sensor depends not only on the axial position of the supporting head on the drive shaft, but also on the rotation speed of this drive shaft, which complicates regulation.

The pellet mill in accordance with the invention avoids this problem in an astonishingly simple manner. It is characterized by the fact that the position measuring means of the position controller is constructed as part of the adjusting mechanism. In this fashion, this position controller is protected against disturbances by the product and by the influence of other press parts.

Construction becomes simple if the adjusting means includes a hydraulic cylinder/piston unit that is provided with a measuring means for the position of the piston relative to the cylinder. Alternatively, however, adjustment of the press rollers for at least one press roller can be accomplished by at least one electronically controlled screw spindle, which then has the same function as the cylinder/piston unit as a positioning member.

Advantageously, the means for regulating position includes a regulating valve with a set point input for the position of the piston, and with a feedback means for the operating valve of the piston position with the regulating valve acting upon the cylinder/piston unit in accordance with the direction of the difference between operating and set point value.

For obtaining and maintaining a precise position, the piston is preferably designed as a double-acting piston. Compared with pistons having mechanical counterforce elements, such as for example springs, this has the advantage of there being present no travel-force dependency. The adjusting mechanism, particularly the set point value input of the regulating valve, can be connected to the machine regulating means.

It is possible to mount the regulating valve on the cylinder of the cylinder/piston unit.

Depending upon the construction of the pellet mill, the cylinder/piston unit can adjust the press roller directly in a predominantly radial direction. In most cases, however, it grips onto an eccentric stud serving to support and adjust the press rollers.

If the piston/cylinder unit is disposed on the press roller carrier within the working space of the mill, the hydraulic and electrical lines are guided, via rotating connections, through the shaft of the roller carrier that is disposed in fixed fashion in operation. In this fashion, these lines are not impaired by the rotation of this roller carrier, which occurs in the case of overloading the mill if the breakaway stud that secures this roller carrier against rotation, breaks. It is possible to control the position of the press rollers externally even after a break, in particular in order to eliminate a blockage in more simple fashion.

This latter advantage is obtained even if the piston/cylinder unit is disposed on the doors, outside the working space of the mill. Accessability to this cylinder/piston unit is improved for maintenance.

It is possible to provide one cylinder/piston unit for each press roller, however, as well as to allow one single unit of this type to act on several press rollers.

In the event of overloading the mill, which is most often signalled by excessive current consumption of the drive motor, it is possible, after interrupting power, for the piston/cylinder unit to remove the press roller from the die and then again be adjusted, in steps, in the direction of the die until the gap between press rollers and die is equal to zero. When the position of the press rollers, stored in the machine regulating means, is reached with gap equal to zero, one knows that the die and the press rollers are again clean and that it is not necessary to open the machine: the mill can again be driven under power.

Precise regulation is strongly improved if the amount of wear of the pairing of die/press roller is entered and stored in the machine regulating means as a function of operating time, and/or of quantity of product produced and serves for correction of the gap between the press rollers and the die. With a cleaner press, it is also possible, when the gap is equal to zero, to establish the positions of the press rollers by raising the pressure in the cylinder/piston unit, and to store this in the machine controlling means. With this, also capable of being controlled in accordance with need, is the stored function: wear=f(time). This construction and method of operation also provide a great advantage relative to protection of personnel, because the doors need not be opened as often, which reduces the danger of accidents.

BRIEF DESCRIPTION OF DRAWINGS

The drawing shows, schematically, as an example, various embodiments of the invention.

FIG. 1 is a section along the line I—I of FIG. 2 through the working space of a pellet mill in accordance with the invention, without the cylinder/piston unit for adjusting the press rollers.

FIG. 2 is a more strongly schematic view, in larger scale, in the direction of arrow II of FIG. 1. The plane of projection is vertical and the observer is looking at the front side of the machine with the doors open.

FIG. 3A is an axial section through a modified embodiment of the pellet mill with adjusting means disposed outside the working space, on the doors of the machine housing, whereas;

FIG. 7 is a section of the working space of a pellet mill based on yet another inventive embodiment, in a view corresponding to that FIG. 1.

DETAILED DESCRIPTION

Press rollers 20 (FIG. 1) of a pellet mill are disposed within a circular die 21 including radial bores or perforations 22. The die 21 is firmly joined with a rotating die retainer, not shown. A firmly mounted roller carrier 23 serves for supporting the cylindrical feet 24 of eccentric studs 25. These eccentric studs 25, relative to feet 24, have eccentric bearing spindles 26 (FIG. 2) for press rollers 20 and a projection 27 disposed coaxially to each foot 24. The projections 27 of the eccentric studs 25 are rotatably mounted in a roller flange 28 attached to the roller carrier 23 by means of spacer bolts, not shown.

The projections 27 are each equipped with a hexagonal head 29 for rotation-fast mounting of lever 30. Linked between levers 30 is a cylinder/piston unit 31. The roller carrier 23 is attached to a horizontal carrier shaft 33 that is mounted in fixed fashion. At its other end, not shown, the carrier shaft 33 is journalled in the machine frame and is held rotation-fast by means of a break-away bolt. Provided in the carrier shaft 33 are additional hydraulic lines 34 as well as some non-represented electrical lines (as well as lubricating lines) that are connected on the non-represented end of the carrier shaft 33, over rotating connections, with the hydraulic and electrical control parts.

Attached inside cylinder 37 (FIG. 3) of the cylinder/piston unit 31 is a measuring rod 38 that cooperates, over a small distance, with a measurement bore 39 in the double-acting piston 40 and its piston rod 41. The exact axial position of the piston 40 is measured by an electronic travel (displacement, stroke) sensing means 45 and is fed back, through a feedback line 46, to a position controller 47 as an operating point value. This position controller 47 is connected to an electrical supply 48 and receives the set point value from the machine regulating means 49 via a set point value input 50.

Figure 3:
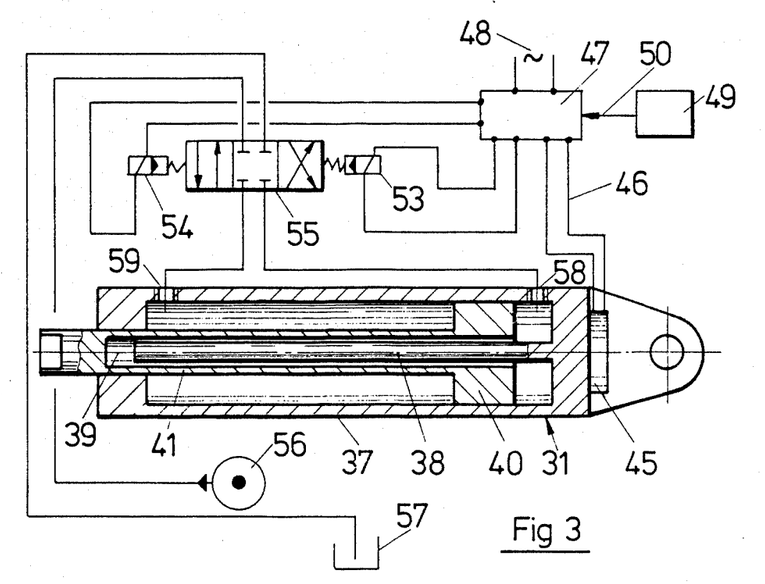
FIG. 3 is a section, in still larger scale, through the piston/cylinder unit of FIG. 2, with the electro-hydraulic schematic for regulating the position of the piston.

Connected to the position controller 47 are two control valves 53, 54 that actuate a four-way valve 55 that is provided with a center blocking position. The four-way valve 55 is connected to a pump 56, or to another source of pressure medium, to the tank 57, as well as to connections 58, 59 of the cylinder 37 on both ends of the double-acting piston 40. Depending upon regulating requirements, capable of being used as control valves 53, 54 are digital valves, proportional valves or servo-valves.

If the operating point value corresponds to the set point value, then the four-way valve 55 remains in the center blocking position represented. If the gaps between press rollers 20 and the die 21 are too great, then position controller 47 switches on control valve 53. In so doing, the four-way valve 55 connects pump 56 with connection 58. By movement of the piston 40 and of the piston rod 41, the cylinder/piston unit 31 extends and levers 30, which rotate about the axis of each foot 24 and/or projection 27, adjust the eccentric stud 25 and, therewith, the press rollers 20 in the direction of the die 21 until the set point is again reached. The position controller 47 then switches off control valve 53 and the four-way valve 55 returns to the center blocking position.

If the gaps between press rollers 20 and the die 21 are too small, the position controller 47 then switches on control valve 54, which connects the pump 56 with connection 59 of the cylinder/piston unit 31, so that the press rollers move away from the die 21 in analogous fashion.

In the case of the other embodiments, parts having the same or a similar function have the same reference numbers as in the case of the first embodiment, however, with a numeral that is advanced in multiples of one-hundred. Naturally, this relationship does not apply for the numbering of the control parts in the diagram of FIG. 8.

Figure 3A:
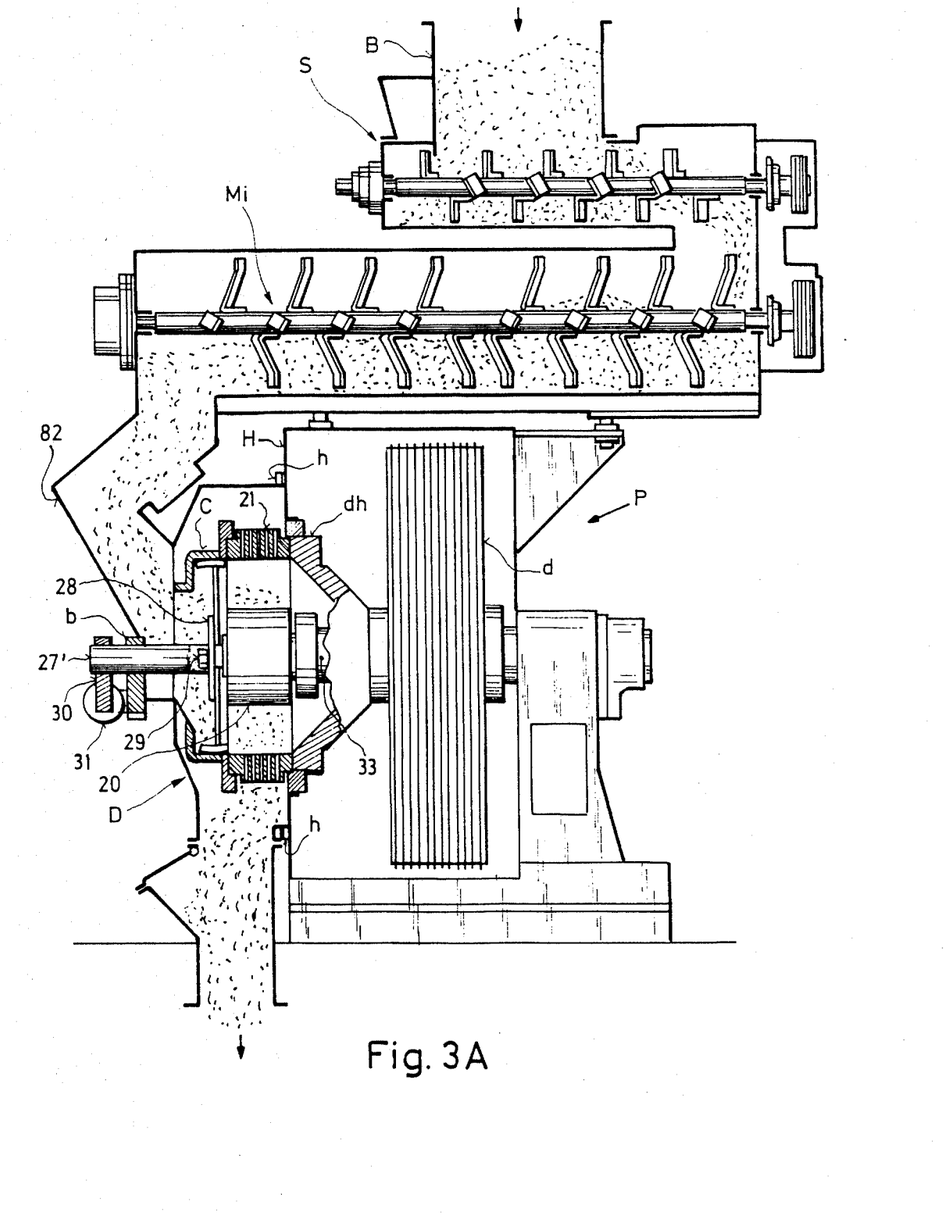

In FIG. 3A the pellet mill is represented in an axial section. It can be seen that the material to pressed from a loading hopper B arrives into a conveying and metering apparatus S, and from there into a mixing apparatus Mi. These two apparatusses are located on the top side of a housing H of the actual pellet mill P, with the outlet of the mixer Mi conveying into bent filler box 82 disposed thereunder, but that is not rigidly connected with the mixer Mi. The underside of the filler box 82 opens out, namely through doors D pivotably suspended on hinges h, into a die cover C swingable with the doors D.

A drive wheel d serves the purpose of setting a die holder dh into rotation while, simultaneously, the carrier shaft 33 for the press rollers 20 is fixed in its bearings, at the right hand side in FIG. 3A, and thus only serves as an axis of rotation for the die roller dh. Already proposed, however, has been to rotate the press rollers while the form remains stationary. It should be pointed out that for purposes of the present invention, it is only necessary that there take place a relative movement between die 21 and press rollers 20, which theoretically can be achieved also by opposing rotation of these two parts.

In this embodiment, the adjusting means takes the form of the cylinder/piston unit 31, for improving accessability to the outer side of the doors D and, thus outside the working space of the pellet mill P. For this purpose, coupled in rotation-fast fashion with the hexagonal head 29 described with the aid of FIGS. 1 to 3, is an extension shaft 27' that is held on the outside of doors D in a bearing block b that is firmly joined with the doors D and carrying on its end lever 30. The cylinder/piston unit 31 can then likewise be attached to the bearing block b. A variant of this embodiment with the adjusting means disposed on the outside of the doors can be seen in the front view of FIG. 6.

Figure 3B:
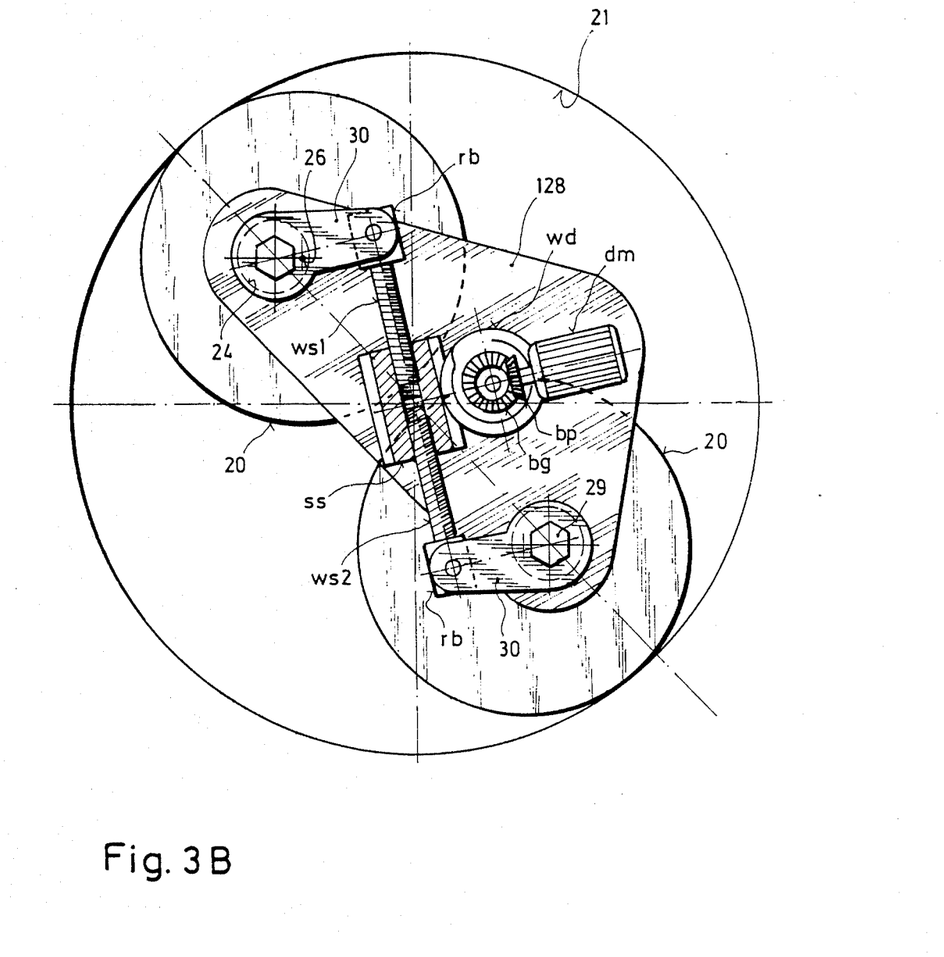
FIG. 3B shows a variant of another embodiment similar to FIG. 2, but with a screw spindle in place of the cylinder/piston unit for adjusting the press rollers.

However, it is not absolutely necessary to use a cylinder/piston unit as the adjusting means, as is illustrated with the aid of FIG. 3B. Here, joined in linking fashion with the ends of each lever 30 is a thrust bearing rb in each of which is journalled in axially non-slideable, but rotatable fashion, the end of screw spindles WD1 and WS2, respectively. As can be seen, each screw spindle WS1 and WS2, has a thread direction that is opposed to the other. Both screw spindles WS1, WS2 are screwed in, at the ends facing away from one another, into a threaded sleeve ss in which, in each case, internal threads, likewise opposing one another, and corresponding to the external threads of spindles WS1, WS2, are provided. On its external side, the threaded sleeve ss is constructed as a spiral, wd helical, or worm gear that is in engagement with a drive wheel wd. The drive wheel wd is journalled, together with a like-axis bevel or spur gear bg, on the press roller flange 128 to which is also attached a drive motor dm whose bevel pinion bp is in engagement with the bevel gear bg.

It is understood that the adjusting means can be structured in various ways. In the case of FIG. 3B, it is recommended to structure the motor dm as a stepping motor, whereby, known from the number of steps out from one position is also the position of the press rollers 20 for the regulating system. When switching on the pellet mill, the stepping motor—as is known per se from other stepping motor control systems (e.g. for typewriters or game of chance automats)—can be brought into the end position first with a non-variable program, with the steps needed for this being stored in a counter, whereupon the direction of rotation of the motor dm is reversed and continues until the counter is again brought to zero. At this moment, the motor dm has reached its initial position that it had assumed before the pellet mill was switched on.

It is also pointed out that instead of two spindles WS1, WS2 a single spindle could be provided, whereby, in place of the bearing rb, threaded sleeves are to be provided into which the spindle turns itself more or less. Then, capable of being provided in the middle of the spindle is a screw wheel in place of the sleeve ss.

In the case of the fourth embodiment, it is not the gap between each press roller 20 and the die 21 that is individually regulated, but rather the sum of these gaps. This approach has the advantage of a low expenditure for equipment, because a single cylinder/piston unit 31 suffices for regulating the two press rollers 30. If the quantity of product supplied divides itself unevenly between the two press rollers 20, the ratio of the two gaps automatically adjusts itself and the adjusting force for both rollers remains the same, which causes uniform wear and prevents transferring non-compensated contacting forces onto the die carrier.

Figure 4:
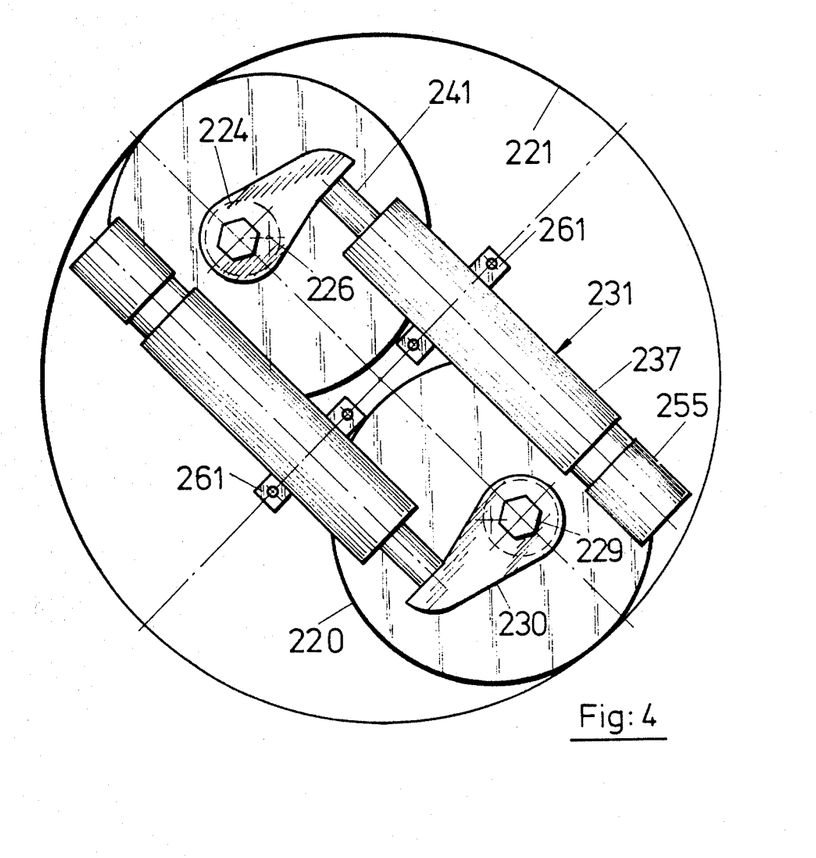
FIG. 4 is a view corresponding to that of FIG. 2 for a further embodiment of the invention.
Figure 5:
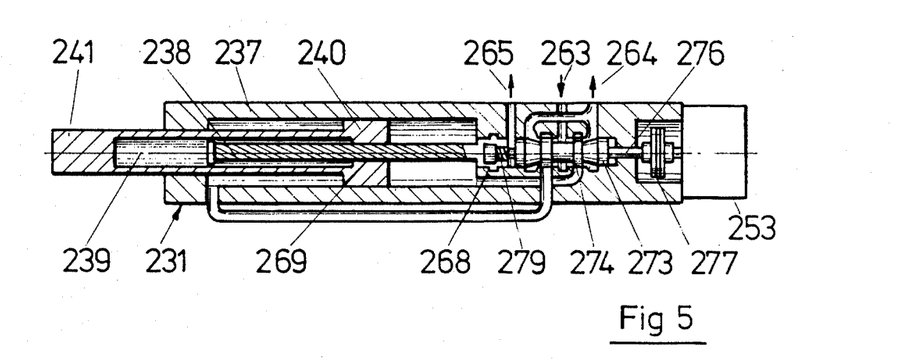
FIG. 5 is a section, in larger scale, through a piston/cylinder unit of FIG. 4.

In many cases, however, it is desired to regulate exactly the gap between each press roller and the die, which is possible with the second embodiment (FIGS. 4 and 5). Provided for each press roller 220 is a separate cylinder/piston unit 231 that is attached to the non-represented roller flange with screws, via attaching tabs 261.

The four-way valve 255 is mounted on the cylinder 237 (FIG. 5), and thereby is integrated in the cylinder/piston unit 231. The inlet 263 is connected with the pump and the outlet 264 is connected with the tank. The leakage oil outlet 265 goes to the tank.

Penetrating into a bore 239 of the piston rod 241 is a coarse pitch screw spindle 238 whose axial position is determined by an axial bearing 268 and remains constant. The screw spindle 238 cooperates with a nut thread 269 inside the double-acting piston 240 that is secured against rotation, so that with an axial actuation of the piston 240 the screw spindle 238 rotates by an exactly corresponding amount of angle. Securing of the piston 240 against rotation can be done in multiple ways at the external part of the piston rod 241.

A valve body 273 including two flanges 274 with control edges which, in the center position, block respectively all inlets and outlets 258, 259, 263 and 264. Attached to the valve body 273 is a rod 276 that is connected, via a rotation-fast but axially flexible coupling 277, with a stepping motor 253 that is controlled by the position controller, depending upon whether standing still, or moved in the desired direction. Attached to the valve body 273 is another screw 279 having a lesser pitch, which cooperates with another nut thread in the axially fixed-maintained screw spindle 238.

In the position shown in FIG. 5, it is assumed that the piston 240 is in the correct position and that the stepping motor 253 is thus stationary. If, for example, the piston rod 241 is extended, the stepping motor 253, and along with it the valve body 273, is rotated by the amount of desired angle and screw 279 turns itself out over a certain length from the nut thread mounted on the end of the axially, fixedly-held screw spindle 238.

Valve body 273 moves the same distance toward the right and connects the inlet 263 of the pump with the outlet 258 on the right hand side of the piston 240. Simultaneously, the inlet 259 on the left hand side of the piston 240 is connected with the outlet 264 to the tank. Piston 240 moves toward the left and the nut 269 rotates the screw spindle 238 by the corresponding amount of angle. In doing this, screw 279 is again screwed into the axially, fixedly-held spindle 238 and valve body 273 is pulled toward the left until the flange 274 again blocks, with its control edges, respectively the inlets and outlets 258, 259, 263 and 264, so that the piston 240 comes to rest.

With an arrangement of this type, it is easy to compensate for wear. With an assumed wear for the pairing of press roller/die of 2 mm over an operating period of 100 hours, and a resolution of the longitudinal mechanism 238, 279 of 0.01 mm per step of the stepping motor 253, the machine regulating means must adjust the set point value by one step each half hour. This method of operation alone, without any further regulation of the gap between the press rollers 220 and the die 221, already provides a considerable improvement. Instead of operating time, it is possible to enter into the machine regulating means the measured, processed amount of product, which yields a still more exact measure of the wear.

Shown in FIG. 4 is a one-sided linking of the piston rods 241 to the levers 230. The product drawn in between the press rollers 220 and die 221 exerts forces that tend to move the press rollers away from the die, and that are taken up by the cylinder/piston units 231.

Figure 6:
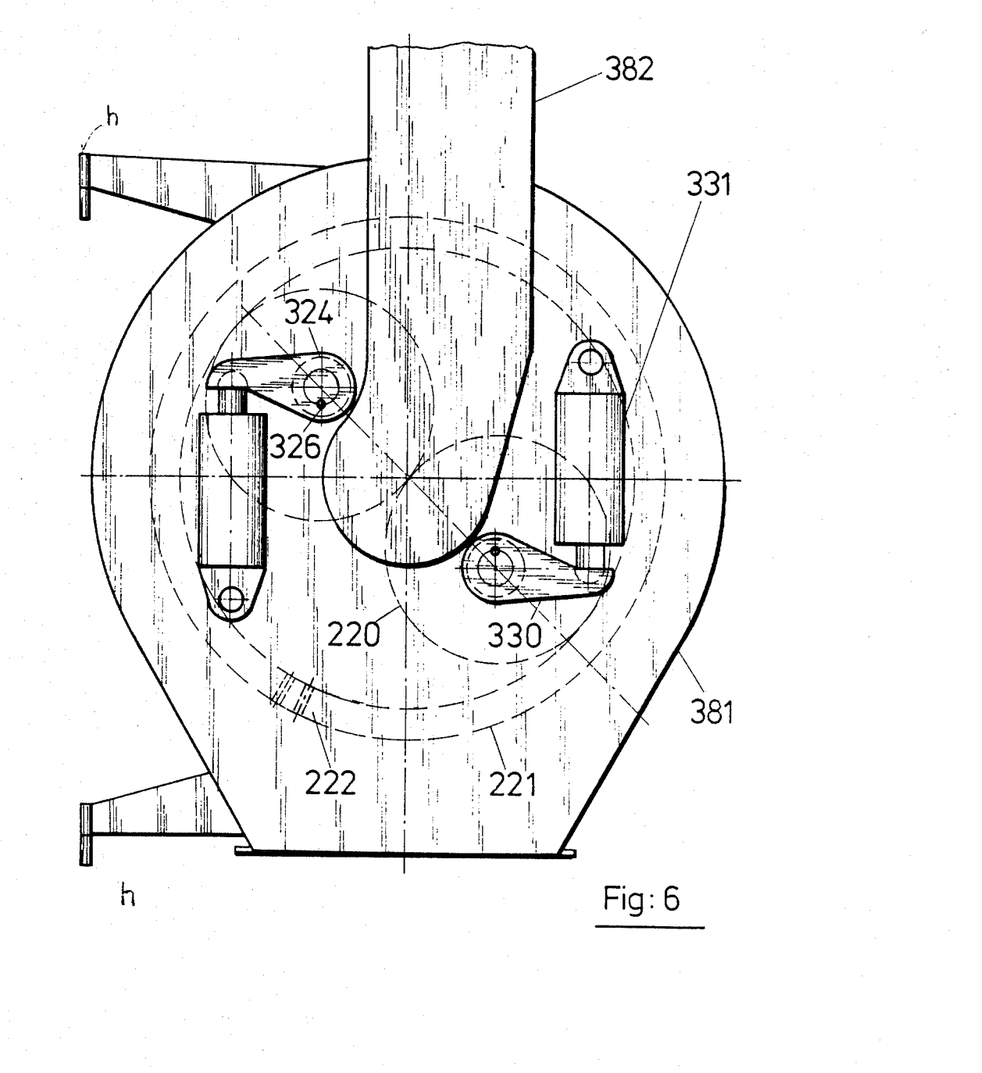
FIG. 6 is a vertical view from the front onto a pellet mill based on another embodiment of the invention.

In the case of the first two embodiments, the cylinder/piston units 31, 231 are disposed inside the pressing space and come into contact with the product. Normally, however, no problems result from this. If, however, very stringent conditions for purity of the product are to be maintained, with the third embodiment of the invention it is possible to link the cylinder/piston units 331 on the outside of the doors 381 (FIG. 6). In order to be able to bring the lever 330 to the desired location, the feedbox 382 is disposed slightly offset laterally. The feet 324 of the eccentric studs are journalled in the doors themselves. The projections for mounting the lever 330 are installed on the front side of the feet 24, and the bearing spindle for the press rollers 320 on the back side of the feet 324. In a variant, the cylinder/piston unit 331 can be replaced by an electronically driven spindle, because there is no contact with the product.

In the case of the first three embodiments, the levers 30, 230 and 330 must be replaced when wear has reached a certain measure. Thanks to this replacement, capable of being achieved again is an optimal cooperation of piston rods 41, 241 and 341 with the levers 30, 230 and 330. In the case of the fourth embodiment, thanks to a radial displacement of the press piston 331, a greater path can be travelled without resetting. Furthermore, the ratio between piston travel and press roller travel is linear, which can simplify control programming.

Press rollers 420 (FIG. 7) are each one journalled on a bearing spindle that ends in a square head 485 and 486 respectively. The double-acting pistons 440 press toward these heads 485 and 486 in the direction of the die 421. Cylinders 437 of the cylinder/piston unit 431 are integrated with the roller carrier 423 and/or with the roller flange 428. Heads 485 and 486 slide in radial guides 488 and 489 of the roller carrier 423 and/or of the roller flange 428. Mounted on the square head 492 is a rod 491 that slides inside a stroke tranducer 492.

Figure 8:
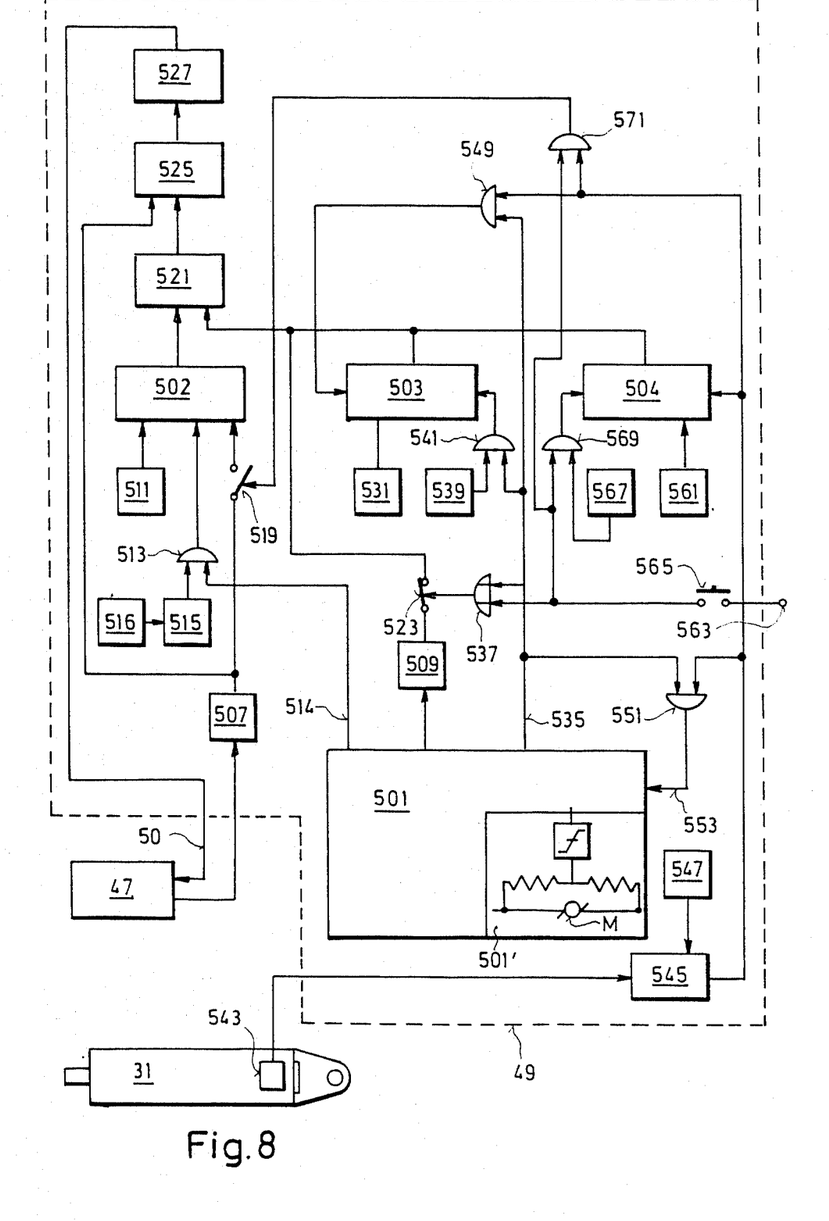
FIG. 8 is a diagram of the machine regulating system indiated in FIG. 3 and also capable of being used in connection with the piston/cylinder unit of FIG. 5, with the control parts essential for the invention being represented in relation to a press control system of known construction.

In the diagram of FIG. 8, the machine control system 49 contains a press controlling means 501 that can be of conventional construction known per se, and a monitoring circuit 501' for overloading of the press motor M for the drive of die 21 and/or press rollers 20. A circuit of this type has been disclosed, for example, in U.S. Pat. No. 3,932,736, which is incorporated herein by reference; and functioning and action of the press controlling means 501 can also be obtained from EP-A No. 0 040 406. Here, interrupted in the case of overloading is at least the power supply to the press (metering arrangement S in FIG. 3A), perhaps also the supply of power to the motor M of the press itself, power consumption of which is monitored by means of the current circuit 501'. For controlling the position of the press rollers, three program memories are provided. A program memory 502 for the zero position of the press rollers, i.e. in the case of a zero gap between the press rollers and die, continuously provides the stored value. During normal operation of the press, the output of the values from a program memory 503 containing a time-controlled program for the set point interval between press rollers is blocked after an overload. Likewise blocked during normal operation of the press are the values of a time-controlled program contained in a program memory 504 for automatic measurement of the zero position of the press rollers in the case of a cleaner die.

An indicator 507 indicates the operating value for the position of the press rollers (operating or actual position), which is signalled from the position controller 47. An indicator 509 shows the set point value for the gaps between press rollers and the die (set point interval). This set point interval, based on the current techological status of the pellet mill, is calculated and signalled through the press control means 501. To be understood under position of the press rollers is the position of the axles of their bearing spindles 26 (FIG. 1). This position of the press rollers is determined by the position of the piston relative to the cylinder of the cylinder/piston units. The gap is measured between the periphery of the press rollers and the internal periphery of the die.

The memory 502 can be influenced in three ways:
(a) with an input 511, capable of being entered manually, e.g. when setting the pellet mill, is the observed or measured value of the zero interval;
(b) by impulses for compensation of the wear of press rollers and die. The pulses come via an AND-member that receives, on the one hand, a signal from the output 514 of the press controlling means 501 so long as the pellet mill is in operation, and on the other hand, receives pulses from a timing pulse generator 515 whose rate can be selected with the aid of a setting means 510. The rate is selected according to the expected rate of wear from the product to be processed; or
(c) by closure of working contact 519 that is open during normal operation, capable of being picked up in the memory 502 is the prevailing value on the indicator 507 for the operating position of the press rollers. This occurs, e.g. in the case of the automatic measurement of the zero position described below, with the aid of the program memory 504.

The zero position stored in the memory 502 is fed to an adding means 521 that also receives, via a working contact 523 that is closed during normal operation, the value of the set point interval from indicator 509. The adding means 521 calculates the set point position of the press rollers and feeds it to a subtracting means 525 that also receives the value of the operating position of the press rollers from the indicator 507.

The result from the subtracting means 525 is fed to the zero comparator 527 that presents this result, via input 50, to the position controller 47 as positive or negative pulses, as the case may be.

As indicated above in the description of FIG. 3, it would also be possible to go directly from the subtracting means 525 to the position controller 47, which then takes care, internally, of the comparison between set point value and operating value.

The program memory 503 can be programmed with a program input 531 for the purpose of determining a time lapse for press roller gaps when the press controlling means 501 has interrupted operation of the pellet mill (or at least its powering) after an overloading of the drive motor. The output of the program memory 503 that is blocked in normal operation of the pellet press is connected with the adding means 521 for calculating the set of operation mentioned, the press controlling means 501 give a signal, at its output 535, that opens the working contact 523 by means of an OR-member 537. This signal and the pulses from a fast acting pulse generator 537 act upon as AND-member that allows the pulse for controlling the runoff of the program stored in the program memory 503 and forwarding it to adding means 521 to pass. The signal from the output 535 persists over a period of time that guarantees runoff of the program.

The cylinder/piston unit 31 is provided with a sensor 543 that measures the pressue of the pressure medium on the piston side, which serves for moving the press rollers 20 toward the die 21. The sensor 543 provides an electrical signal corresponding to the pressure to a comparator 545 upon which acts an input 547 for a maximum allowable pressure. When overshooting this pressure, the comparator 545 give off a pulse to an AND-member 549 that also receives the signal from the output 535 of the press controlling means 501. The AND-member 549 can feed the pulse from the comparator 545 to the program memory 503 in order to stop runoff of the program and to reset the program memory 503 by switching off the effect of the pulse from the AND-member. Alternatively, the output signal of the comparator 545 could also be used for recognizing an overloading of the press in place of control circuit 501', and be fed to the control means 501, through its output 535, for initiating the program.

Self-evident, capable of being used in place of sensor 543' for the fluid pressure in cylinder 31 is also any other pressure transducer for the press roller pressure, for example a piezo-electric pressure measuring device on the press roller bearing or on the piston rod of the cylinder 31.

In the embodiment illustrated in FIG. 8, also connected to the output 535 of the press controlling means 501 and to the output of the comparator 545 is an AND-member 551. This conducts the pulse from the comparator 545 to the input 553 of the press controlling means 501 in order to prevent restart of the pellet mill, without opening the press doors, for cleaning the pressing space.

The program memory 504 can be programmed with a program input means 561 for controlling runoff of the gaps of the press rollers, so that the zero position of the press rollers can be maintained. The output of the program memory 504 that is blocked in normal operation is connected with the adding means 521 for calculating the set point position of the press rollers. When closing a pushbutton switch 565 connected to a terminal 563, working contact 523 is opened via the OR-member 537. Connected to the pushbutton switch 565 is an AND-member 567 and connected to a high speed timing generator 539 is an AND-member 569 that can allow to pass the pulse for controlling runoff of the stored program and for feeding the corresponding values to the adding means 521. The program memory 504 is connected with the output of the comparator 545, whose control pulse terminates runoff of the program and resets the program memory 504. An AND-member 571 is connected to the pushbutton switch 565 and to the output side of the comparator 545. It conducts the control pulse from the comparator 545 for closing the working contact 519.

The controlling means 49 operates as follows:

When changing out the die 21, the zero position of the press rollers 20 is measured and entered manually into the input means 511. The rate of the timing pulse generator 515 is selected by the setting means 516, corresponding to the expected rate of wear of press rollers and die. In normal operation of the press, the AND-member 513 is continuously acted upon by the signal from the output 514 of the press controlling means 501 and transfers the pulse from the timing pulse generator 515 to the memory 502 where the stored zero position is therewith changed, corrsponding to the time duration of operation. The zero position from memory 502 and the set point interval between press rollers and die calculated from the press controlling means 501 and indicated on the indicator 509 are fed to the adding means 521 that calculates the set point position of the rollers. This calculated set point position and the operating position from indicator 507 are fed to the subtracting means 525 that passes on to the zero comparator 527 the deviation from the set point position, with the corresponding sign. This passes on the required control pulse with the desired sign to the position controller 47.

If overloading leading to stoppage of the pellet mill and/or interruption of its power supply occur through the press controlling means 501, the press controlling means gives off a signal at its output 535, the duration of which is selected such that runoff of the entire test program described in the following is guaranteed. The signal from output 535 opens, via the OR-member 537, working contact 523, which interrupts the connection between the indicator 509 of the set point gap means and the adding means 521. Simultaneously, the pulses of the high speed pulse generator 539 are fed, via the AND-member 541, to the program memory 503, whose output is unblocked and whose program runs off correspoding to the rate given. In this fashion, the adding means 521 receives the value of set gap from program memory 503. Next, the program increases the gap. Then the program orders adjustment of the press rollers up to a zero gap.

Instead of entering zero position manually via input 511, it is possible, with the aid of the program memory 504, to proceed automatically. When closing the pushbutton switch 565, working contact 523 is open via the OR-member 537 and the connection between the indicator 509 and the adding means 521 is broken. Simultaneously, the AND-member 569 conducts the pulses of the high speed pulse generator 567 to the program memory 504 and unblocks its output to the adding means 521. The program reduces the gap between the press rollers and the die. Also provided are negative set point gaps for the case where the die and press rollers are more worn than would correspond to the zero position stored in the memory 502.

Movement of the press rollers continues until they come into contact with the die. Then, the pressure rises momentarily at sensor 543, above the maximum pressure entered at input 547, and comparator 545 emits a pulse to the program memory 504, which interrupts runoff of the program and resets program memory 504. Simultaneously, the pulse from comparator 545 is conducted to the working contact 519 over the AND-member 571, the working contact closing briefly. By doing this, the SET POINT position of the press rollers is picked up in memory 502 as the zero position. This automatic measuring of zero position is, interestingly, not only based on a change in form. It can from time to time be used to check, in memory 502, the zero position based on the wear to be expected. With this, one can see whether the rate, when setting contrivance 516, has been selected correctly or whether it needs to be corrected.

In a variant, instead of the timing pulse generator 515, it will be possible to use a pulse generator that is controlled as a function of the amount of product to be processed. Capable of being used as a measure for this quantity of product is the sum of the weighings ahead of the mill, or the sum of the revolutions of the feed worm to the press mixer could serve. The thus obtained values could further be multiplied by a coefficient in order to take into account the wear occurring based on product per unit of weight processed. A further variant could consist of connecting the output of the input stage 516 for the value of wear per unit of operating time (wherein it should also be understood wear per pellet quantity produced) directly with the position controller 47 instead of with the timing pulse generator 515, and feeding to this latter the amount of position connection to be executed per unit of operating time. In this case, for example, capable of being entered into a counter is the output signal of the timing pulse generator 515 which, upon receiving a certain number of pulses, triggers the position correction. In each case, however, it is understood that the setting means 516 represents—in its broadest sense—a memory for the specific amount of wear entered which, for a given raw material to be pressed, can be determined once empirically and then be continuously available. In doing this, it may be practical to structure the position controller 47 with a manual setting means such that position corrections can also be entered manually, for example by repeated closing, as applicable, of a switch for moving the press rollers 20 toward the die 21 or away therefrom (which, e.g., is connected via a differentiating capacitor with a monoflop, so that a pulse of defined duration is obtained per switch actuation), with each switch actuation leading to a stepping movement of the press rollers in one or the other direction.

What is claimed is:

1. A pellet mill for forming pellets from a material, comprising:
   perforated die means having substantially cylindrical inner and outer surfaces;
   at least a first press roller rotatable about an axis for rotation over a cylindrical surface of said die means;
   drive means for imparting relative rotational movement between said die means and said press roller;
   bearing means for said press roller, said bearing means being displaceable for moving said press roller toward and away from said cylindrical surface; and
   displacing means for said bearing means, including:
      displacement drive means connected to said bearing means; and
      control means for said displacement drive means, including position sensing means for determining at least indirectly the position of said bearing means and said press roller, said position sensing means being mounted directly on said displacement drive means.

2. A pellet mill as claimed in claim 1, wherein said displacement drive means comprises:
   fluidically actuable cylinder and piston means including a cylinder unit of a hollow cylinder having two ends and at least one opening in the region of one of its ends for admitting a fluid;
   a piston within said cylinder, said piston having at least one actuating surface to be biased by a fluid in said cylinder; and
   a piston rod on said piston, said position sensing means arranged on said cylinder and piston means for sensing the relative position of said piston and said cylinder.

3. A pellet mill as claimed in claim 2, where said position sensing means comprise measuring rod means extending parallel to said piston rod means.

4. A pellet mill as claimed in claim 2, wherein said position sensing means are at least in part located within said cylinder and piston means.

5. A pellet mill as claimed in claim 2, wherein said control means comprises:
   control valve means for controlling said fluid in said cylinder;
   setting means for the nominal value of the position of said bearing means and said press roller, said setting means providing a first output signal;
   said position sensing means providing a second output signal corresponding to the actual position of said press roller; and
   control circuit means receiving said first and second output signals and providing a control signal for adjusting said control valve means as a function of the difference of said nominal value and said actual position.

6. A pellet mill as claimed in claim 5, wherein said control valve means are attached to said cylinder and piston means.

7. A pellet mill as claimed in claim 5, wherein said setting means comprise milling control means for controlling at least one parameter of milling operation and for providing said first output signal.

8. A pellet mill as claimed in claim 2, further comprising at least a second press roller rotatable about an axis parallel to that of said first press roller, said cylinder and piston means including a cylinder unit for each of said press rollers.

9. A pellet mill as claimed in claim 2, wherein said piston comprises two actuating surfaces being opposite to one another, while said cylinder comprises at least two openings at opposite ends.

10. A pellet mill as claimed in claim 2, further comprising support means for said movable bearing means, said cylinder and piston means being arranged on said support means.

11. A pellet mill as claimed in claim 2, further comprising:
   housing means for covering inside at least said die means, said press roller means and said bearing means;
   door means on said housing for making said die means, said press roller means and said bearing means accessible from the outside;
   said cylinder and piston means being arranged on the outside of said door means.

12. A pellet mill as claimed in claim 1, wherein said bearing means comprises:
   rotational bearing means, and an eccentric bearing pin for said press roller, and said bearing pin being rotatably mounted within said rotational bearing means;

said displacing drive means being connected to said eccentric bearing pin means to rotate the same for displacing said press roller.

13. A pellet mill as claimed in claim 1, further including:

milling control means for controlling at least one parameter of milling operation and for providing an output signal, said control means being connected to said milling control means for receiving the output signal of said milling control means.

14. A pellet mill as claimed in claim 10, wherein said drive means comprise motor means, said parameter being of actual load of said motor means.

15. A pellet mill as claimed in claim 1, wherein said displacement drive means comprise screw spindle means being rotatably mounted, and internal thread means receiving said screw means.

16. A pellet mill for forming pellets from a material comprising:

supply means for said material;

forming means including perforated die means having substantially cylindrical inner and outer surfaces;

at least a first press roller rotatable about an axis for rotation over a cylindrical surface of said die means;

drive means for imparting relative rotational movement between said die means and said press roller;

overload determining means for determining an overload condition on said forming means in which the load on said forming means exceeds a predetermined first nominal value, and for stopping the operation of at least said supply means, when an overload condition occurs, said overload determining means including program operated means;

bearing means for said press roller, said bearing means being displaceable for moving said press roller toward to and away from said cylindrical surface; and displacing means for said bearing means, comprising:

displacement drive means connected to said bearing means; and control means for said displacement drive means, said control means being connected to said program operated means;

said program operated means causing said displacement drive means through said control means in a first step to displace said press roller away from said cylindrical surface, when an overload condition occurs, and then to redisplace in a second step said press roller toward said cylindrical surface until the press roller engages said second cylindrical surface, said redisplacement movement being interrupted, when an overload condition occurs in which the load exceeds a predetermined second nominal value, said second step being reinitiated when the load has fallen below said predetermined second nominal value.

17. A pellet mill as claimed in claim 16, wherein said displacing means further comprise position sensing means for determining at least indirectly the position of said bearing means and said press roller, said position sensing means being arranged on said displacement drive means.

18. A pellet mill as claimed in claim 16, wherein said program operated means comprise electronic program means.

19. A pellet mill as claimed in claim 16, wherein said overload determining means comprise a pressure sensor connected to said press roller to determine a pressure corresponding to that exerted onto the press roller and to provide a pressure signal.

20. A pellet mill as claimed in claim 19, wherein said overload determining means comprise comparing means receiving said pressure signal and comparing it with said predetermined second nominal value.

21. A pellet mill as claimed in claim 19, wherein said program operated means are connected to said pressure sensor to initiate at least part of at least one of said steps of their program.

22. A pellet mill as claimed in claim 19, wherein said displacement drive means comprise fluidically actuable cylinder and piston means including;

a cylinder unit of a hollow cylinder having two ends and a least one opening in the region of one of its ends for admitting a fluid;

a piston within said cylinder, said piston having at least one actuating surface to be biased by a fluid in said cylinder; and a piston rod on said piston;

said pressure sensor being connected to said hollow cylinder to sense the pressure of the fluid therein.

23. A pellet mill for forming pellets from a material, comprising:

perforated die means having substantially cylindrical inner and outer surfaces;

at least a first press roller having a circumferential surface and being rotatable about an axis for rotation over a cylindrical surface of said die means;

drive means for imparting relative rotational movement between said die means and said press roller, the movement resulting in a certain wear of the surfaces of said die means and said press roller, said wear being a function of the operating time of said pellet mill;

bearing means for said press roller, said bearing means being displaceable for moving said press roller towards and away from said cylindrical surface; and displacing means for said bearing means, comprising:

displacement drive means connected to said bearing means;

control means for said displacement drive means and including memory means having an input for inputting the wear operation time, and having an output to deliver an output signal;

timer means for determining the operation time, said timer means providing a clock pulse signal; and a position correcting circuit for correcting the position of said press roller, said circuit being connected to said memory means and said timer means to receive said clock signal and for controlling the displacement drive means as a function of the operation time and the wear inputted in said memory means.

24. A pellet mill as claimed in claim 23, wherein said memory means are connected to said timer means for adjusting the speed of succession of said clock pulse signal as a function of said wear per operation time.

* * * * *